United States Patent [19]

Gorog

[11] Patent Number: 4,459,692
[45] Date of Patent: Jul. 10, 1984

[54] SIGNAL PICKUP CARTRIDGE

[75] Inventor: Istvan Gorog, Princeton, N.J.

[73] Assignee: RCA Corporation, New York, N.Y.

[21] Appl. No.: 341,143

[22] Filed: Jan. 20, 1982

[51] Int. Cl.³ .............................................. G11B 9/06
[52] U.S. Cl. .................................... 369/126; 369/170
[58] Field of Search .......... 369/43, 126, 138, 150-151, 369/170-172; 358/335, 342

[56] References Cited

U.S. PATENT DOCUMENTS

| 3,136,555 | 6/1964 | De Vries | 369/171 |
| 3,699,268 | 10/1972 | Miller | 179/100.41 R |
| 3,952,145 | 4/1976 | Allen | 178/6.6 R |
| 3,952,147 | 4/1976 | Leedom | 178/6.6 R |
| 4,030,124 | 6/1977 | Allen | 358/128 |
| 4,038,682 | 7/1977 | Allen | 358/128 |
| 4,360,909 | 11/1982 | Tajima | 369/170 |
| 4,404,669 | 9/1983 | Miller | 369/170 |
| 4,410,976 | 10/1983 | Uchida et al. | 369/170 |

Primary Examiner—Raymond F. Cardillo, Jr.
Attorney, Agent, or Firm—E. M. Whitacre; J. S. Tripoli; E. P. Herrmann

[57] ABSTRACT

A signal pickup cartridge is formed in two sections to facilitate assembly of a leaf spring to a stylus therein. The two sections are dimensioned to permit suspension of the stylus to the first section but protruding therefrom and connection of one end of the leaf spring to the second section with the second end of the leaf spring also protruding therefrom. The leaf spring is connected to the stylus after which the two cartridge sections are joined to form a contiguous enclosure to house the stylus assembly.

4 Claims, 3 Drawing Figures

SIGNAL PICKUP CARTRIDGE

BACKGROUND OF THE INVENTION

This invention relates to signal pickup cartridges and more particularly to a cartridge which is bifurcated to facilitate assembly.

Certain pickup cartridges, for example, those used in Capacitance Electronic Disc players, include an enclosure into which is assembled to a pickup arm delicately suspended therein. Typically the pickup arm will have a tiny pickup stylus secured to one end which engages the disc record to recover recorded signal. A leaf spring deformed in an arc is connected between the cartridge enclosure and the stylus to provide electrical contact between the stylus and pickup circuitry and to provide a desired amount of pressure between the stylus and the disc, see for example U.S. Pat. No. 4,030,124 entitled "Video Disc Playback System and Pickup Cartridge Therefor". Nominally the constituent parts of the enclosure and pickup assembly are small and/or delicate and difficult to handle with respect to the assembly process. It is particularly difficult to align and secure the leaf spring to the stylus/stylus arm within the relatively small enclosure when it is bowed in a compressive arc. The present invention facilitates assembly of the leaf spring by bifurcating the cartridge so that the leaf spring can be assembled to the stylus/stylus arm and the cartridge before being arced or bowed and effectively enlarges the cartridge enclosure to expedite assembly.

SUMMARY OF THE INVENTION

The present invention is a cartridge enclosure which is separable into two parts, the separation occurring proximate the stylus end of the cartridge so that a stylus arm assembly mounted in one of said parts will protrude therefrom. The second of such parts includes the fixture for securing the leaf spring to the cartridge. During assembly of the stylus/stylus arm in the cartridge the two parts of the cartridge are detached. The stylus/stylus arm is suspended in the first part and the leaf spring (uncompressed) is secured in the second part. The leaf spring is arranged generally parallel to the longitudinal axis of the cartridge with its free end extended outside of the second part of the cartridge. The second end of the leaf spring is secured to the stylus/stylus arm while both are extended outside of their respective parts of the cartridge enclosure. The second part is thereafter rotated to produce the desired compressive arc in the leaf spring and the two parts of the cartridge are coupled together.

DETAILED DESCRIPTION OF THE INVENTION

Figure 1:
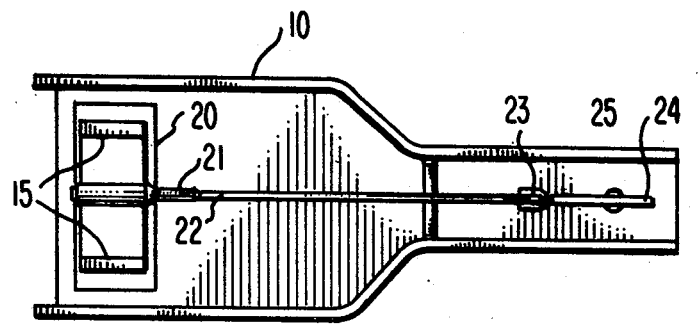
FIG. 1 is a bottom view of a typical signal pickup cartridge for use in a video disc player.
Figure 2:
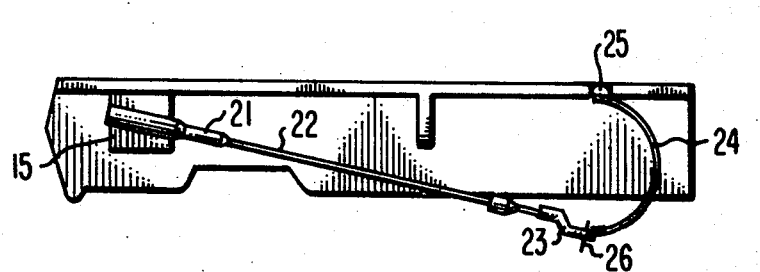
FIG. 2 is a side view (in cross section) of the FIG. 1 cartridge.

The invention will be described in terms of a video disc signal pickup cartridge as exemplified by FIGS. 1 and 2. The cartridge comprises a rigid enclosure 10 having sidewalls and a top surface. The bottom plane of the enclosure is either partially or totally open so that the pickup stylus 26 may protrude therethrough to engage a disc record. At least the end portion of the cartridge nearest the stylus is narrowed so that ancillary devices such as stylus position sensors may be located proximate the stylus but exterior to the cartridge.

Typically the stylus 26 is secured to a stylus holder 23 which in turn is mounted to a first end of a lightweight stylus arm 22. The stylus arm 22 is compliantly suspended in the cartridge 10 by a flexible suspension 20 secured to posts 15. A compliant coupler 21 interfaces the stylus arm 22 with the suspension 20, the composite suspension permitting limited longitudinal and pivotal motion of the stylus arm.

A leaf spring 24, deformed in an arc, is connected to the cartridge 10 by means of a fixed rivet or a rotatable ball and socket structure 25 for example. The other end of the leaf spring is secured to the stylus or the stylus holder and is electrically connected to the stylus. The arc of deformation in the leaf spring tends to expel the stylus/stylus arm downward out of the cartridge enclosure. It should be appreciated that if the leaf spring is first attached to the cartridge/stylus, securing the other end to the stylus/cartridge is made difficult by the enclosure and the fact that the leaf spring must be bowed-/arced into compression.

Figure 3:
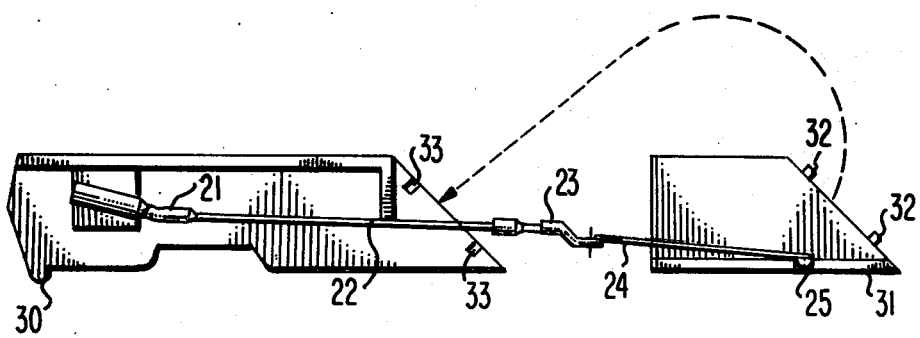
FIG. 3 is a side view of a cartridge similar to the FIG. 1 cartridge but with the enclosure bifurcated to permit assembly of the leaf spring to the stylus in an undeformed state.

The cartridge of FIG. 3 being of bifurcated design alleviates the asembly difficulty by (a) making the stylus more readily accessible and (b) permitting connection of the leaf spring to both the stylus and cartridge while it is in a relaxed state. The cartridge comprises a first enclosure section 30 for suspending the stylus/stylus arm assembly and dimensioned so that the stylus extends beyond the longitudinal bounds of the enclosure. A second enclosure section 31 designed to mate (via guide pins 32 and slots 33) with the first section 30 includes the structure 25 for securing the leaf spring to the cartridge. The overall cartridge enclosure which is formed when the two sections are combined is similar to the unitary cartridge enclosure of FIGS. 1 and 2.

Assembly of the bifurcated cartridge is accomplished by first suspending the stylus/stylus arm in the section 30. Thereafter one end of the leaf spring 24 is secured to the structure 25 in the section 31. The second end of the leaf spring protrudes from the normally forward end of the cartridge at this stage of the assembly process. The second section 31 is aligned longitudinally with the first section 30 but rotated e.g. 180 degrees, about an axis normal to the sidewalls of the enclosure so that the stylus and the second end of the leaf spring are brought into coincidence. The leaf spring may thereafter be secured to the stylus or stylus holder outside the bounds of the enclosure while the leaf spring is in a relaxed position. The section 31 is then rotated 180 degrees counterclockwise (in the FIG. 3 arrangement) and fixedly mated to section 30. The 180 degree rotation produces the required arc in the leaf spring which ultimately provides the desired stylus-disc pressure.

The mating surfaces of the two cartridge sections are shown to be angled approximately 45 degrees relative to the horizontal plane. This feature tends to make both the stylus and the structure 25 more accessible for assembly purposes as compared to the case where the mating surfaces are made to be vertical.

What is claimed is:

1. A pickup cartridge comprising:

an enclosure having a top wall and sidewalls and formed from first and second separable sections;

a stylus arm having one end suspended in a first end of the first section;

a pickup stylus positioned at the other end of said stylus arm; and a leaf spring connected between said stylus and an inner surface of said top wall of said second section in a compressive arc formation, said leaf spring tending to expel said stylus from said enclosure;

said first and second sections of said enclosure having corresponding mating surfaces at the second end of the first section and the first end of the second section such that said first and second sections form said enclosure when said corresponding surfaces are mated.

2. The pickup cartridge according to claim 1 wherein said first section is dimensioned such that the second end of said stylus arm and said stylus extend beyond the second end of said first section.

3. The pickup cartridge according to claim 2 wherein the second end of the second section extends beyond the second end of said stylus arm and said stylus when said first and second sections are mated.

4. The pickup cartridge according to claim 3 wherein said mating surfaces are angled relative to the longitudinal axis of said sidewalls such that said stylus is exposed when said first and second sections are separated.

* * * * *